(12) United States Patent
Benzel et al.

(10) Patent No.: US 7,073,400 B2
(45) Date of Patent: Jul. 11, 2006

(54) SENSOR FOR MEASURING PRESSURE IN A SEALED VOLUME

(75) Inventors: Hubert Benzel, Pliezhausen (DE);
Stefan Pinter, Reutlingen (DE);
Helmut Grutzeck, Maehringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/658,059

(22) Filed: Sep. 9, 2003

(65) Prior Publication Data

US 2004/0093962 A1 May 20, 2004

(30) Foreign Application Priority Data

Sep. 19, 2002 (DE) ................ 102 43 515

(51) Int. Cl.
*G01L 1/02* (2006.01)
(52) U.S. Cl. .................. 73/862.581; 73/715
(58) Field of Classification Search ............. 73/716, 73/720, 721, 726, 727, 715, 862.581
See application file for complete search history.

(56) References Cited

U.S. PATENT DOCUMENTS

| 5,095,755 A | 3/1992 | Peterson | |
| 5,207,102 A * | 5/1993 | Takahashi et al. | 73/727 |
| 5,262,641 A * | 11/1993 | Kemp | 250/231.19 |
| 5,289,033 A * | 2/1994 | Asami et al. | 257/676 |
| 6,105,436 A * | 8/2000 | Lischer et al. | 73/724 |
| 6,148,673 A * | 11/2000 | Brown | 73/721 |
| 6,732,589 B1 * | 5/2004 | Eickhoff et al. | 73/715 |
| 2002/0073783 A1 * | 6/2002 | Wilner et al. | 73/716 |

FOREIGN PATENT DOCUMENTS

| DE | 8 905 918 | 8/1989 |
| EP | 0 373 010 | 6/1994 |
| EP | 0 764 839 | 3/1997 |
| EP | 1 167 938 | 1/2002 |

* cited by examiner

*Primary Examiner*—Edward Lefkowitz
*Assistant Examiner*—Andre Allen
(74) *Attorney, Agent, or Firm*—Kenyon & Kenyon LLP

(57) ABSTRACT

A sensor for measuring a force is provided, which sensor includes a first sealed volume, a second sealed volume, a pressure diaphragm and a force diaphragm. The pressure diaphragm has a first side and a second side, with a pressure of the first sealed volume acting on the first side, and a pressure of the second sealed volume acting on the second side. The force diaphragm is exposed to a force, and the pressure of the first volume is dependent on the force acting on the force diaphragm.

11 Claims, 3 Drawing Sheets

SENSOR FOR MEASURING PRESSURE IN A SEALED VOLUME

FIELD OF THE INVENTION

The present invention relates to a sensor for measuring force, and relates more particularly to a sensor that utilizes a measurement of a pressure in a sealed volume.

BACKGROUND INFORMATION

Methods are known for employing the transducer principles of a displacement measurement or a strain measurement to measure forces. In these known methods, the results are evaluated piezoresistively in the case of a strain measurement, or evaluated optically, capacitively, or inductively in the case of a displacement measurement.

SUMMARY OF THE INVENTION

The sensor according to the present invention provides advantages over the known art by facilitating a measurement of a force or a fluid pressure (gas or liquid) by using a measurement of a pressure in a sealed volume. A pressure in a sealed volume is readily measurable using simple means, which makes a sensor of this type especially economical to manufacture. It is also possible to use standard pressure sensors, including their evaluation electronics, as a component of the sensor system according to the present invention, which further reduces the cost of manufacturing the sensor of the present invention.

A further advantage of the sensor according to the present invention is that the sensor is able to measure both positive and negative forces. In this context, negative forces may be defined as forces in a predefined direction that are oriented opposite to the direction of the positive forces.

In the case of the sensor according to the present invention, it is also possible to easily adjust the sensitivity of the sensor according to the present invention via the gas pressure in the sealed volume as well as via the size of the volume or the diaphragm parameters (in particular, diameter and thickness). It is also possible to conduct a self-test to check the plausibility of measurements, for example if the measuring volume has a leak.

Another advantage of the present invention is that the measuring range for the forces to be measured is adjustable by dimensioning the mechanically deformable parts, e.g., the diameter and thickness of the force diaphragm. It is also possible to use a sensor according to the present invention to measure pressures, e.g., high pressures. A further advantage is that the force diaphragm may have a media-resistant design.

In an example embodiment of the present invention, the sensor is provide with a first and second sealed volumes, which essentially have the same temperature. This produces a temperature change that results in a change in pressure in the sealed volumes, but does not corrupt the measured values. Another advantage is that the volumes are hermetically sealed by welding, either with or without prior clamping. This makes it possible to provide especially reliable protection of the fluids enclosed in the volumes, in particular gases, and prevent leakage.

A further advantage of the present invention is that a mechanical stop is provided. This makes it possible to provide a force overload protection or pressure overload protection. Yet another advantage is provided by a strain gauge that is connected to the pressure diaphragm. This permits especially easy and economical manufacture of the sensor according to the present invention.

DETAILED DESCRIPTION

Figure 1:
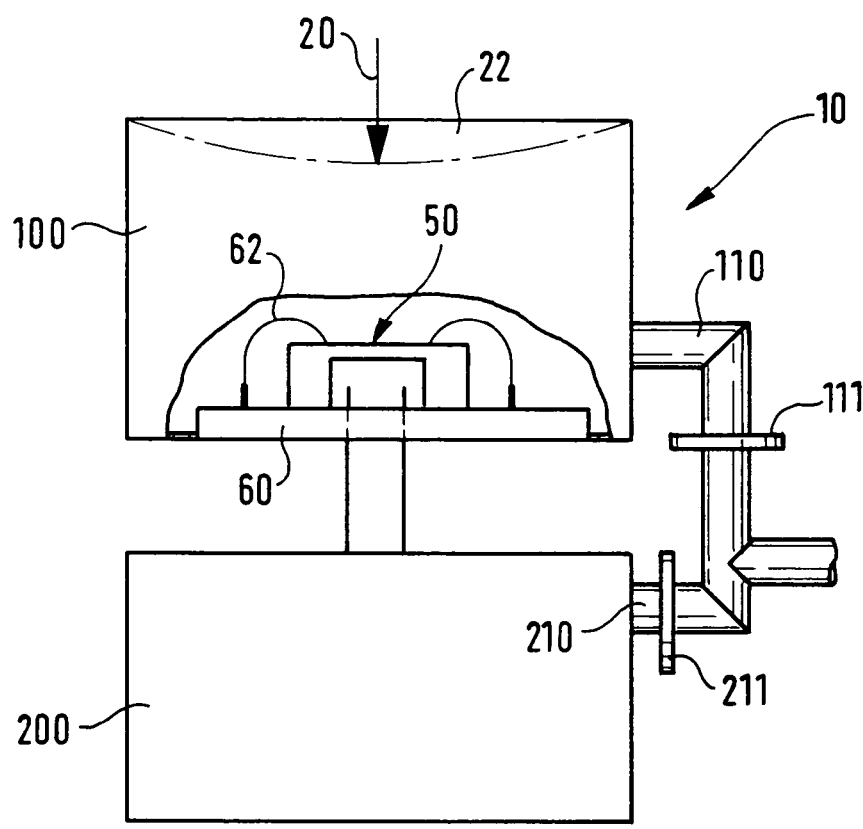
FIG. 1 shows a schematic sketch illustrating the principle of the sensor according to the present invention.

As shown in FIG. 1, which is a schematic sketch illustrating the measuring principle according to the present invention, the sensor according to the present invention is identified by reference number 10, and the sensor includes a first volume 100 and a second volume 200. Volumes 100, 200 are hermetically sealed and contain a fluid, e.g., a gas, for which reason they are also referred to below as "gas volumes" 100, 200. First volume 100 is located in, and defined by, a solid body that is elastically deformable by external forces. The external force that deforms the body surrounding first volume 100 is shown in FIG. 1 by an arrow identified by reference number 20. The deformation of the body that defines, i.e., surrounds, first volume 100 is illustrated by a dotted line in the area of arrow 20. The deformation of the body defining the first volume 100 produces a change in pressure in first volume 100.

Because the gas pressure in the first volume 100 is dependent on temperature according to the law of gases, a reference volume, i.e., second volume 200, is used for compensation purposes. To determine externally applied force 20, the pressure difference between both volumes 100, 200 is measured by a gas pressure sensor, which is provided according to the present invention in the form of a relative pressure sensor that includes a pressure diaphragm 50. Pressure diaphragm 50 is provided to measure the relative pressure, the pressure in first volume 100 acting upon one side thereof and the pressure in second volume 200 acting upon its second side.

First volume 100 is deformed by external force 20, which results in a change in volume, and therefore also results in a pressure change in sealed volume 100, i.e., in the closed solid body surrounding first volume 100. The proportionality between the application of force 20 and the volume change or pressure change is given for small deformations, i.e., for small deflections of diaphragm 22 of the solid body, which diaphragm is also referred to below as force diaphragm 22. As mentioned above, the pressure sensor includes pressure diaphragm 50, which is deflected by the change in relative pressure between first volume 100 and second volume 200. The deflection of diaphragm 50 is detected by sensor elements, which are not illustrated in FIG. 1, and electrical signals resulting therefrom are transmitted over connecting lines 62 to a printed-circuit board 60, where the signals from the sensor elements are evaluated or transmitted elsewhere. The mechanical deformation of force diaphragm 22 must be designed in accordance with external force 20 to be measured and the measurement area of the relative pressure sensor, whose diaphragm is pressure diaphragm 50.

For assembly purposes, both first volume 100 and second volume (reference volume) 200 are hermetically sealed according to the present invention only after one or more welding processes have been completed. For example, open tubes that lead to the outside and are identified in FIG. 1 by reference number 110 in the case of first volume 100 and by reference number 210 in the case of second volume 200 may be used to achieve this hermetic seal. Tubes 110, 210 may be welded together by first clamping and then welding. If a seal is provided, in particular by welding, the gas pressure in volumes 100, 200 is adjustable. If the gas pressure is the same in both volumes, a change in temperature does not produce a pressure difference between the two volumes, i.e., there is no temperature coefficient of the offset. However, the absolute pressure in both volumes rises and falls at the same rate. When the temperature changes in both volumes 100, 200, resulting in a pressure change in both volumes 100, 200, the change in pressure therefore varies with each application of force 20. This means that there is a temperature coefficient of the sensitivity of sensor 10 according to the present invention. This temperature coefficient of the sensitivity of sensor 10 according to the present invention may be calculated thermodynamically and taken into account when calibrating the relative pressure sensor built into sensor 10 according to the present invention. The sensitivity may be influenced via the gas pressure set in volumes 100, 200.

A properly set pressure between the external environment and volumes 100, 200 results in implausible measured values, e.g., values outside the measurement range, if a leak occurs in one of volumes 100, 200. Implausible measured values of this type may then be used to check the serviceability of sensor 10 according to the present invention, e.g., by conducting a plausibility check of this type during a self test.

According to the law of gases, the following relationship exists:

$$(p+dp)*(V+dV)=\text{constant}$$

In the above relationship, actual sensor volume V, i.e., first volume 100, should be minimized to achieve a substantial pressure change dp. In the above formula, p also represents the pressure in first volume 100 and dV the change in first volume 100.

Figure 2:
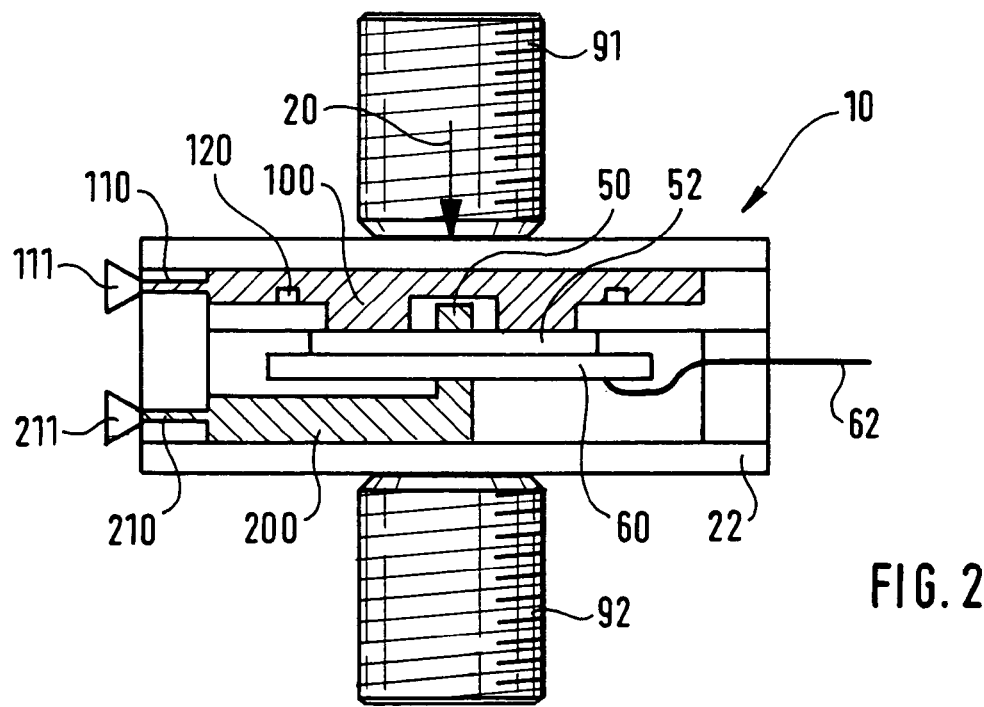
FIG. 2 shows a first exemplary embodiment of the sensor according to the present invention.

FIG. 2 shows a first exemplary embodiment of a sensor system according to the present invention. Reference numbers 91 and 92 each identify a threaded pin that is connected at the top and bottom to sensor system 10 according to the present invention. Actual sensor system 10 includes force diaphragm 22, which is adjacent to first volume 100. First volume 100 is connected to the external environment by a channel 110, which may also be designed as tube 110, and closed by a sealing means 111. According to the present invention, however, it is also possible for first volume 100 to be simply surrounded by the housing of sensor system 10, which is not identified by a separate reference number, instead of providing a channel or tube of this type.

The housing of sensor system 10 according to the present invention also has a recess for second volume 200, which in the exemplary embodiment illustrated in FIG. 2 also includes a connecting passage (i.e., a tube) 210 and a sealing means 211, although this is not absolutely necessary in sensor system 10 according to the present invention. The housing of sensor system 10 is designed so that first volume 100 and second volume 200 have access to two different sides of pressure diaphragm 50 and thus act upon the pressure diaphragm. Pressure diaphragm 50 is part of a relative pressure sensor built into the sensor system according to the present invention, the relative pressure sensor and its pressure diaphragm 50 being mounted on a sensor base 52. In the exemplary embodiment illustrated in FIG. 2, sensor base 52 is additionally connected to a printed-circuit board 60, from which electrical connecting lines 62 provide an electrical connection between sensor system 10 and the external environment. First threaded pin 91 is used to conduct force 20 to force diaphragm 22.

Figure 3A:
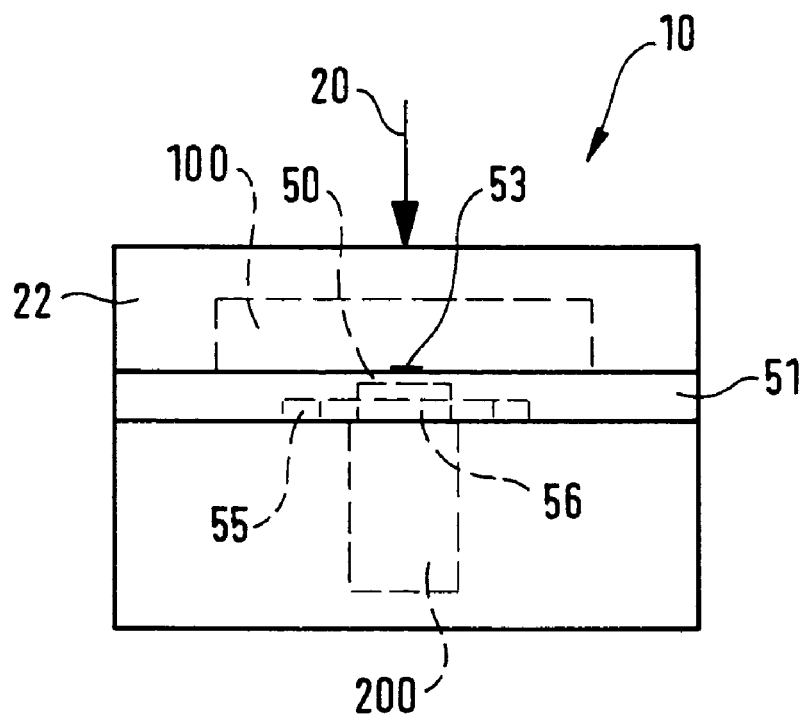
FIG. 3A shows a cross-sectional view of a second exemplary embodiment of the sensor according to the present invention.
Figure 3B:
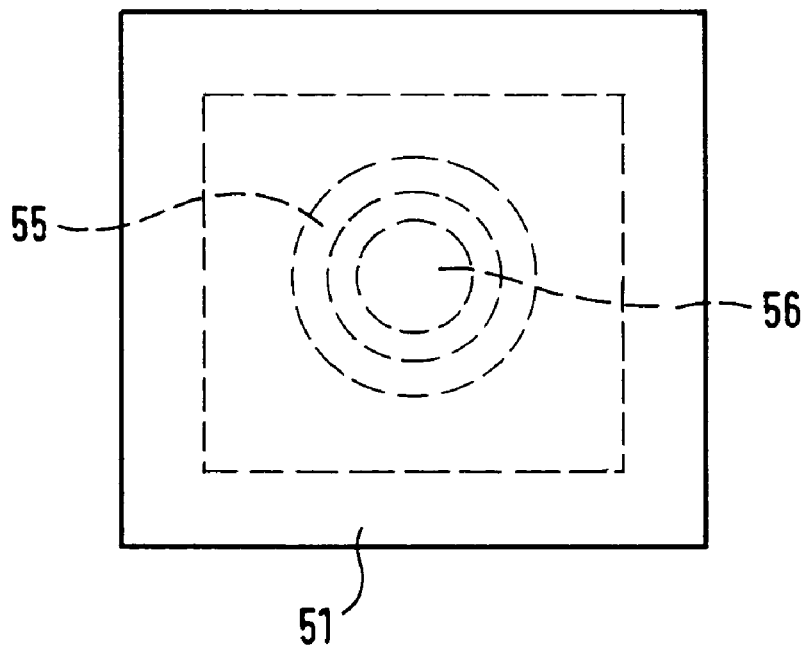
FIG. 3B shows a top view of a second exemplary embodiment of the sensor according to the present invention.

FIGS. 3A and 3B show a second exemplary embodiment of sensor 10 according to the present invention. The second exemplary embodiment of sensor 10 according to the present invention incorporates the use of foil strain gauges. The foil strain gauges are identified by reference number 53 in FIG. 3A and are located on pressure diaphragm 50. In this case, strain gauges 53 are used as elements to measure the deformation of pressure diaphragm 50. In the second exemplary embodiment illustrated in FIGS. 3A and 3B, a force or media pressure 20 to be measured is also present and acts upon deformable force diaphragm 22. Deformable force diaphragm 22 is connected to first volume 100, which acts upon one side of pressure diaphragm 50, and the pressure force of second volume 200 acts upon the other side of the pressure diaphragm.

In the second exemplary embodiment, pressure diaphragm 50 is provided on a sensor plane 51, which is also referred to as carrier foil or foil. The foil strain gauges include carrier foil onto which a strain gauge is mounted. The carrier foil may be a metal foil or a plastic foil or a silicon diaphragm. The advantage of using a metal foil as the carrier of the strain gauge structure is that the housing of sensor system 10, which again is not identified by a reference number in FIGS. 3A and 3B, may be made of the same metal, which means thermal expansions do not produce mechanical stresses in the materials or conduct mechanical stresses to the materials. Such a construction of sensor 10 according to the present invention generally ensures relatively good insulation against lateral forces. The strain gauges on pressure diaphragm 50 may therefore be attached, for example, using a thin film technique. The structural design of the foil used to produce pressure diaphragm 50 is such that it carries strain gauges on one side. To increase sensitivity, the foil may be structurally formed on the back, as is shown by reference number 56 in FIGS. 3A and 3B. Structured area 56 or the strain gauges may be provided either on the side of first volume 100 or on the side of second volume 200.

To insulate the sensor signal from thermal expansion differences, additional rear structured areas, which are identified by reference number 55 in FIGS. 3A and 3B, may be provided. In FIG. 3B is illustrated a top view of the second embodiment of sensor system 10 according to the present invention, where rear structured areas 55, 56 of foil 51 are recognizable when viewed from above. Strain gauges 53 are not visible in FIG. 3B.

Figure 4:
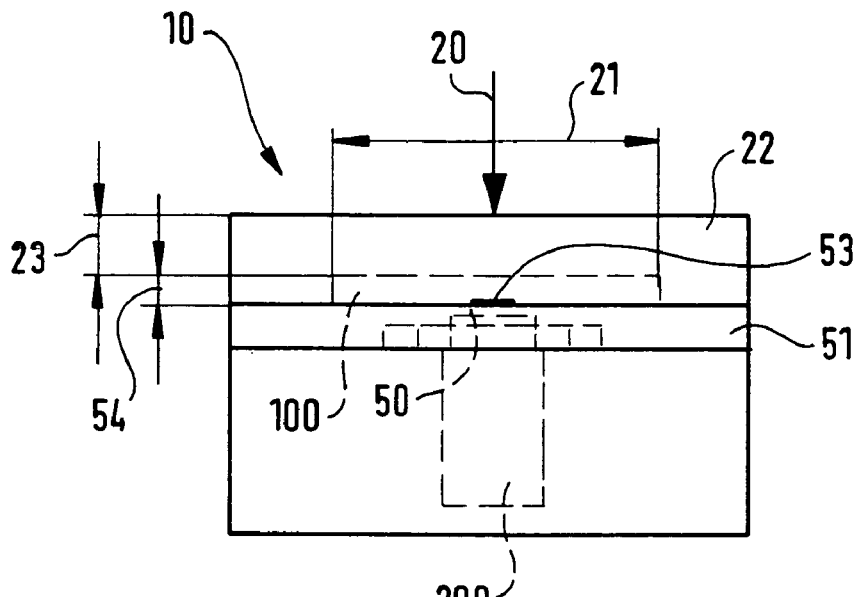
FIG. 4 shows a further cross-sectional view of the second exemplary embodiment of the sensor according to the present invention.

FIG. 4 shows a further cross-sectional view of the second embodiment of sensor system 10 according to the present invention. In addition to force 20 to be measured, first volume 100, second volume 200, foil 51, pressure diaphragm 50 and the measuring element provided in the form of strain gauge 53, FIG. 4 also shows effective width 21 of force 20 applied to force diaphragm 22, as well as effective thickness 23 of force diaphragm 22 and effective height 54 of first volume 100. Assuming an effective width 21, i.e., an effective diameter 21, of 5 mm, for example, for transmitting force 20 to force diaphragm 22, force 20 is active according to the present invention only within a range of, for example, 80 percent of effective width 53, i.e., within the range of a diameter of approximately 4 mm according to the specified example. Thickness 23 of force diaphragm 22 is, for example, 0.5 mm, and the effective height of first volume 100, which is identified by reference number 54, is, for example, 0.05 mm according to the present invention. In this embodiment, the pressure change is roughly estimated to be 3.6 mbar between first volume 100 and second volume 200 per 10 Newtons of force 20 acting thereupon. This shows that first volume 10 of a diaphragm foil pressure sensor is especially optimizable, i.e., first volume 100 may be of particularly compact construction.

Figure 5:
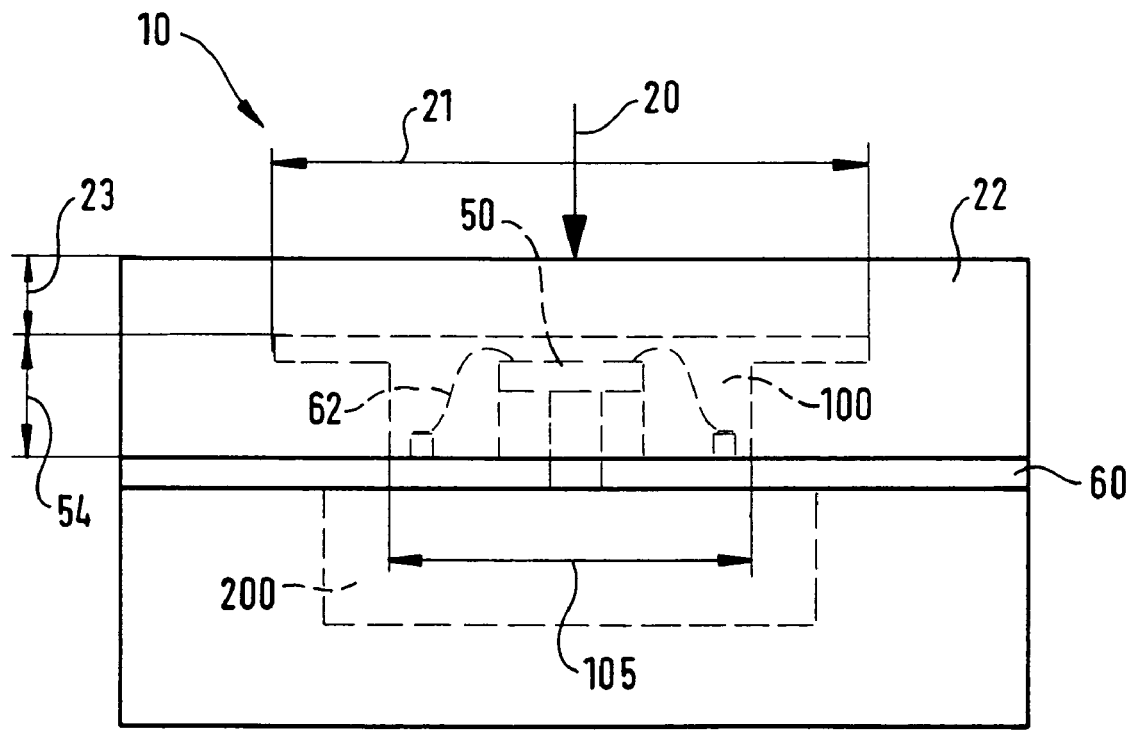
FIG. 5 shows a cross-sectional view of a third exemplary embodiment of the sensor according to the present invention.

FIG. 5 shows a third exemplary embodiment of sensor system 10 according to the present invention. First volume 100, second volume 200, active force 20, force diaphragm 22, and pressure diaphragm 50 are again illustrated in FIG. 5. FIG. 5 also shows electrical connecting lines 62 between the sensor elements (not shown) on pressure diaphragm 50, as well as connections to points on printed-circuit board 60. In the third exemplary embodiment of sensor system 10 according to the present invention as illustrated in FIG. 5, a standard low-pressure sensor is used as the relative pressure sensor. In this case, first volume 100 must be reconstructed so that first volume 100 may not have as compact a design as in the second embodiment shown in FIG. 4. Once again, effective width 21, i.e., diameter 21, of force 20 acting upon force diaphragm 22 is illustrated, along with the effective height, i.e., thickness, of force diaphragm 22. The relevant height 54 for first volume 100 is also illustrated. According to an exemplary embodiment, in which effective width 21 is, for example, 40 mm; thickness 23 of force diaphragm 22 is, for example, approximately 1 mm; and effective height 54 of first volume 100 is approximately 3.5 mm, the pressure change is only 0.56 mbar per 10 Newtons of pressure 20 acting thereupon. According to this example, the main width of first volume 100, which is identified in FIG. 5 by reference number 105, is approximately 10 mm; the height of the relative pressure sensor on printed-circuit board 60 is approximately 3 mm, and its diameter approximately 5 mm, although the latter is not explicitly illustrated in FIG. 5.

FIGS. 4 and 5 represent exemplary embodiments having small and large gas volumes, respectively. All parameters, such as shape and size of the gas volumes as well as the shape, diameter, thickness and clamping of the force diaphragm are generally variable to adapt the output signal (pressure change).

What is claimed is:

1. A sensor for measuring a force, comprising:
   a first sealed volume defined by a first body portion;
   a second sealed volume defined by a second body portion;
   a pressure diaphragm having a first side and a second side, wherein a pressure of the first sealed volume acts on the first side, and wherein a pressure of the second sealed volume acts on the second side; and
   a force diaphragm exposed to a force;
   wherein the pressure of the first volume is dependent on the force acting on the force diaphragm.

2. The sensor as recited in claim 1, wherein the first sealed volume and the second sealed volume have substantially the same temperature.

3. The sensor as recited in claim 2, wherein the first and second sealed volumes are hermetically sealed with respect to an environment.

4. The sensor as recited in claim 1, further comprising:
   a mechanical stop.

5. The sensor as recited in claim 1, further comprising:
   a strain gauge connected to the pressure diaphragm.

6. A method of measuring a pressure, comprising:
   providing a first sealed volume defined by a first body portion;
   providing a second sealed volume defined by a second body portion;
   applying a pressure of the first sealed volume to a first side of a pressure diaphragm;
   applying a pressure of the second sealed volume to a second side of the pressure diaphragm; and
   exposing a force diaphragm to a force;
   wherein the pressure of the first volume is dependent on the force acting on the force diaphragm.

7. The method as recited in claim 6, further comprising:
   providing the first sealed volume and the second sealed volume with substantially the same temperature.

8. The method as recited in claim 6, wherein the first and second sealed volumes are hermetically sealed with respect to an environment.

9. The sensor as recited in claim 1, wherein the first sealed volume and the second sealed volume are directed to respective sealed gas volumes.

10. The method as recited in claim 6, wherein the first sealed volume and the second sealed volume are directed to respective sealed gas volumes.

11. The sensor as recited in claim 1, further comprising:
    an arrangement to perform a self-test.

* * * * *